(12) United States Patent
Kato et al.

(10) Patent No.: US 8,094,170 B2
(45) Date of Patent: Jan. 10, 2012

(54) COMPOSITE IMAGE-GENERATING DEVICE AND COMPUTER-READABLE MEDIUM STORING PROGRAM FOR CAUSING COMPUTER TO FUNCTION AS COMPOSITE IMAGE-GENERATING DEVICE

(75) Inventors: Kozo Kato, Okazaki (JP); Mitsuhiko Ohta, Tsu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 300 days.

(21) Appl. No.: 12/206,135

(22) Filed: Sep. 8, 2008

(65) Prior Publication Data
US 2009/0066726 A1  Mar. 12, 2009

(30) Foreign Application Priority Data
Sep. 10, 2007  (JP) ................. 2007-234194

(51) Int. Cl.
*G09G 5/00* (2006.01)
(52) U.S. Cl. ........ 345/647; 345/629; 345/639; 345/641; 348/148; 348/231.3
(58) Field of Classification Search .............. 345/629, 345/647, 639, 641; 348/148, 231.3
See application file for complete search history.

(56) References Cited

U.S. PATENT DOCUMENTS

| | | | |
|---|---|---|---|
| 6,985,171 B1 * | 1/2006 | Kuriya et al. | 348/148 |
| 7,576,767 B2 * | 8/2009 | Lee et al. | 345/645 |
| 7,932,934 B2 * | 4/2011 | Maekawa | 348/231.3 |
| 2003/0206179 A1 * | 11/2003 | Deering | 345/589 |
| 2004/0258329 A1 | 12/2004 | Jiang et al. | |
| 2005/0219264 A1 * | 10/2005 | Shum et al. | 345/629 |
| 2008/0309763 A1 * | 12/2008 | Hongo | 348/148 |
| 2009/0066811 A1 * | 3/2009 | Maekawa | 348/231.3 |
| 2010/0090929 A1 * | 4/2010 | Tsujimoto | 345/7 |

FOREIGN PATENT DOCUMENTS

| | | |
|---|---|---|
| DE | 100 83 445 T1 | 11/2001 |
| JP | 2002-251632 | 9/2002 |
| JP | 2006-238131 | 9/2006 |
| JP | 2007-26071 | 2/2007 |
| WO | WO 00/64175 | 10/2000 |

OTHER PUBLICATIONS

Nijmeijer, A.G.J., et al., "Correction of Lens-Distortion for Real-Time Image Processing Systems", p. 1-9, 1993.*
Office Action issued Oct. 18, 2010, in German Patent Application No. 10 2008 046 398.1-31 (with English translation).

* cited by examiner

*Primary Examiner* — Chante Harrison
(74) *Attorney, Agent, or Firm* — Oblon, Spivak, McClelland, Maier & Neustadt, L.L.P.

(57) ABSTRACT

A composite image-generating device includes: a geometric transformation table that assigns coordinates corresponding to positions of pixels of an output image on an input image received from a capturing section; and an output image-generating section that generates the output image by superimposing an overlay image based on overlay data associated with the positions of the pixels of the output image in the geometric transformation table on an image obtained by geometrically transforming the input image according to the geometric transformation table.

6 Claims, 20 Drawing Sheets

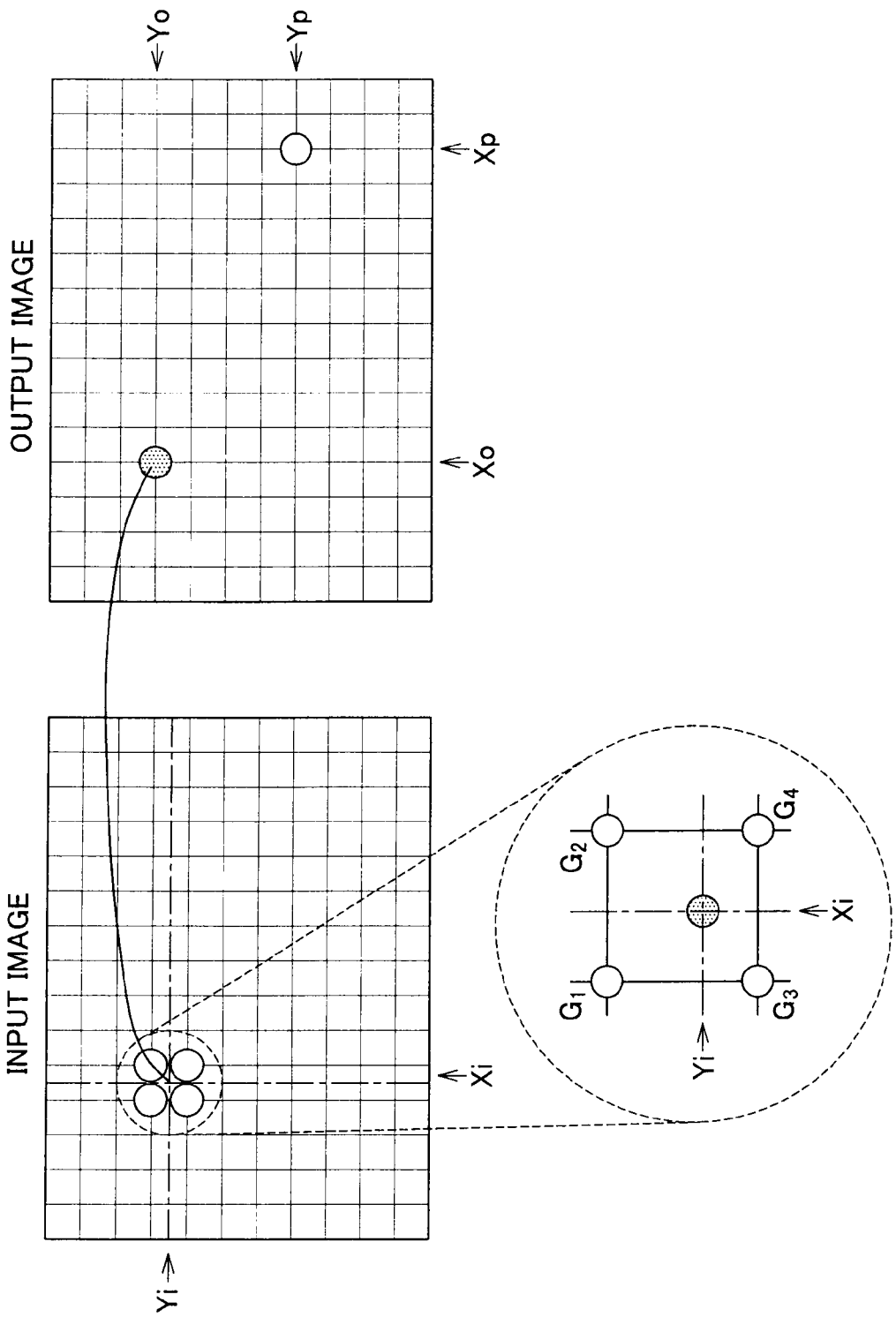

BEFORE CORRECTING DISTORTION

AFTER CORRECTING DISTORTION

EXTENSION LINES INDICATIVE
OF VEHICLE WIDTH

| | Coordinates for geometric transformation | Blending coefficient |
|---|---|---|
| | ⋮ | ⋮ |
| $(X_o, Y_o)$ | $(X_i, Y_i)$ | $\alpha_i$ |
| | ⋮ | ⋮ |
| $(X_p, Y_p)$ | $(X_j, Y_j)$ | $\alpha_j$ |
| | ⋮ | ⋮ |

| | Coordinates for geometric transformation | Blending coefficient | Displayed color |
|---|---|---|---|
| | ⋮ | ⋮ | ⋮ |
| $(X_o, Y_o)$ | $(X_i, Y_i)$ | $\alpha_i$ | $C_i$ |
| | ⋮ | ⋮ | ⋮ |
| $(X_p, Y_p)$ | $(X_j, Y_j)$ | $\alpha_j$ | $C_j$ |
| | ⋮ | ⋮ | ⋮ |

| | | |
|---|---|---|
| | ⋮ | ⋮ |
| $(X_o, Y_o)$ | $(X_i, Y_i)$ | $C_i$ |
| | ⋮ | ⋮ |
| $(X_p, Y_p)$ | $(X_j, Y_j)$ | $C_j$ |
| | ⋮ | ⋮ |

COORDINATES FOR GEOMETRIC TRANSFORMATION — DISPLAYED COLOR

○ :ORIGINAL PIXEL VALUE
◉ :DISPLAYED COLOR

○ :ORIGINAL PIXEL VALUE
◉ :DISPLAYED COLOR

FIG. 20

| BINARY | DECIMAL | COMPLEMENT (BINARY) | COMPLEMENT (DECIMAL) |
|---|---|---|---|
| 0.0000 | 0 | 1.0000 | 1 |
| 0.0001 | 0.0625 | 0.1111 | 0.9375 |
| 0.0010 | 0.125 | 0.1110 | 0.875 |
| 0.0011 | 0.1875 | 0.1101 | 0.8125 |
| 0.0100 | 0.25 | 0.1100 | 0.75 |
| 0.0101 | 0.3125 | 0.1011 | 0.6875 |
| 0.0110 | 0.375 | 0.1010 | 0.625 |
| 0.0111 | 0.4375 | 0.1001 | 0.5625 |
| 0.1000 | 0.5 | 0.1000 | 0.5 |
| 0.1001 | 0.5625 | 0.0111 | 0.4375 |
| 0.1010 | 0.625 | 0.0110 | 0.375 |
| 0.1011 | 0.6875 | 0.0101 | 0.3125 |
| 0.1100 | 0.75 | 0.0100 | 0.25 |
| 0.1101 | 0.8125 | 0.0011 | 0.1875 |
| 0.1110 | 0.875 | 0.0010 | 0.125 |
| 0.1111 | 0.9375 | 0.0001 | 0.0625 |

# COMPOSITE IMAGE-GENERATING DEVICE AND COMPUTER-READABLE MEDIUM STORING PROGRAM FOR CAUSING COMPUTER TO FUNCTION AS COMPOSITE IMAGE-GENERATING DEVICE

INCORPORATION BY REFERENCE

The disclosure of Japanese Patent Application No. 2007-234194 filed on Sep. 10, 2007 including the specification, drawings and abstract is incorporated herein by reference in its entirety.

BACKGROUND OF THE INVENTION

1. Field of the Invention

The invention relates to a composite image-generating device that transforms an input image received from a capturing section into an output image and, as needed, generates an output image with an overlay image superimposed on the transformed image. In addition, the invention relates to a computer-readable medium storing a program for causing a computer to function as the composite image-generating device.

2. Description of the Related Art

In general, a system has been studied and put into practical use in which a captured image taken by a camera for capturing images of the view from a vehicle is displayed in a vehicle cabin so that a driver, for example, can see the captured image, and in addition, the captured image is displayed with a computer-generated image superimposed on the captured image. There are various contents as conceivable specific contents superimposed on the captured image taken by the camera, such as one in which objects to which attention should be paid, such as curbstones and chocks, and pedestrians, are highlighted, one in which assistive lines drawn by extending side edges of the vehicle, and one in which an arrow that indicates the travel direction is displayed on the image of a front view from the vehicle as a navigation display.

As an example of such a system, an invention is described in Japanese Patent Application Publication No, 2006-238131 (JP-A-2006-238131), the invention relating to a vehicle vicinity-monitoring system that displays, as a background image, a captured image taken by a capturing section for capturing images of the view from a vehicle and translucently displays the vehicle.

However, in JP-A-2006-238131, a composite image is generated as the background image, using the captured image, the history thereof, etc. in accordance with the data in a coordinate conversion table, and then a drawing operation section performs a drawing operation (paragraph [0018] in JP-A-2006-238131). Thus, the size and costs of the entire system increase. However, the demand for reducing size and costs of on-board devices is strong, and improvement is therefore needed.

SUMMARY OF THE INVENTION

The invention provides a composite image-generating device with which it is possible to reduce costs required to realize a process of superimposing an overlay image on an image that is obtained by transforming an input image received from a capturing section, and the invention also provides a computer-readable medium storing a program for causing a computer to function as the composite image-generating device.

A composite image-generating device according to a first aspect of the invention includes: a geometric transformation table that assigns coordinates corresponding to positions of pixels of an output image on an input image received from a capturing section; and an output image-generating section that generates the output image by superimposing an overlay image based on overlay data associated with the positions of the pixels of the output image in the geometric transformation table on an image obtained by geometrically transforming the input image according to the geometric transformation table.

In general, the "overlay" section superimposing of image data, and the "overlay image" herein section an additionally displayed image or pixel, such as a computer-generated image that is superimposed on a background image obtained by geometrically transforming a captured image. The term "overlay data" section the data required to superimpose the "overlay image" on the background image.

With the above first aspect, the overlay data for displaying an overlay image are associated with the positions of pixels of the output image in the geometric transformation table, and based on such associations, a process of superimposing the overlay image on the geometrically transformed image is performed, so that it is possible to perform general geometric transformation and superimposing of an overlay image with a single geometric transformation table. Thus, particularly in the case where a regular image is superimposed as the overlay image, it is possible to reduce costs required to realize the process of superimposing an overlay image on the image that is obtained by transforming the input image received from the capturing section, as compared to the case where an overlay image is superimposed after a geometrical transformation is performed. Note that the device is significantly advantageous in terms of space, costs, and weight particularly when the device is installed in a vehicle.

A composite image-generating device according to a second aspect of the invention includes: a geometric transformation table that assigns coordinates corresponding to positions of pixels of an output image on an input image received from a capturing section; and an output image-generating section that generates the output image by performing interpolation based on pixel values of pixels surrounding a point with the coordinates assigned in the geometric transformation table, wherein the output image-generating section generates the output image by replacing, based on the overlay data, at least part of the pixel values of the pixels that surround the point with the coordinates assigned on the input image and then performing the interpolation, with regard to the pixel of the output image for which overlay data is provided.

A computer-readable medium storing a program according to a third aspect of the invention is a computer-readable medium storing a program for causing a computer to function as the composite image-generating device according to the above aspects.

The invention provides a composite image-generating device with which it is possible to reduce costs required to realize a process of superimposing an overlay image on an image that is obtained by transforming an input image received from a capturing section, and the invention also provides a computer-readable medium storing a program for causing a computer to function as the composite image-generating device.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 3 is a diagram showing the correspondences between coordinates in an input image and coordinates in an output image in the first embodiment;

FIG. 8A is a diagram illustrating a geometric transformation table 12 of the second embodiment;

FIG. 8B is a diagram illustrating another geometric transformation table 12 of the second embodiment;

FIG. 14 is a diagram illustrating a geometric transformation table 14 of the fourth embodiment;

FIG. 20 is a diagram showing correspondences between binary expression and decimal expression that represent fractional part of coordinate Xi, and the complement number thereof in the fifth embodiment.

DETAILED DESCRIPTION OF EMBODIMENTS

A composite image-generating device 1 according to a first embodiment of the invention will be described below. The composite image-generating device 1 is installed in a vehicle, for example, and displays, on a display device, an image that is obtained by superimposing an overlay image on an image of the view from the vehicle that is captured by a camera. The "overlay image" herein section an additionally displayed image or pixel, such as a computer-generated image that is superimposed on a background image obtained by geometrically transforming the captured image.

Figure 1:
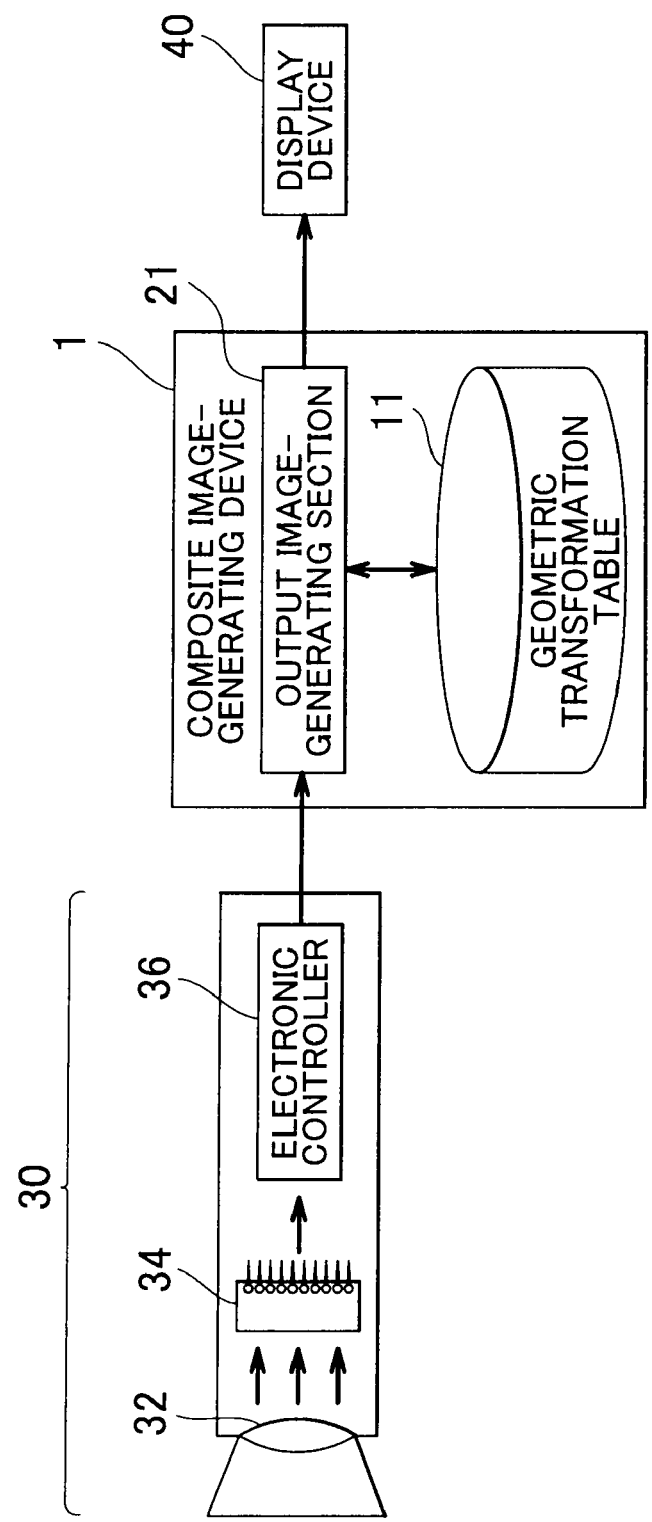
FIG. 1 is a diagram showing a composite image-generating device 1 according to a first embodiment of the invention, devices connected thereto, etc.

FIG. 1 is a diagram showing the composite image-generating device 1 according to the first embodiment of the invention, devices connected thereto, etc. A camera 30 and a display device 40 are connected to the composite image-generating device 1.

The camera 30 is a camera using a charge coupled device (CCD), a complementary metal oxide semiconductor (CMOS), or the like, for example. The camera 30 is disposed near the number plate at the rear of the vehicle, for example, and captures the image of a wide-angle rear view from the vehicle. Note that such an arrangement is merely an example, and in devices to which the invention can be applied, the direction in which images are captured from the vehicle, such as the front direction, a diagonally front direction, a lateral direction, an upward direction, or a downward direction, and the angle at which the images are captured are arbitrary.

The camera 30 includes a camera lens 32, an image sensor 34, and an electronic controller 36, for example. The following description will be made on the assumption that the camera 30 is a CCD camera. The camera lens 32 includes a fisheye lens that enables wide-angle imaging. The image sensor 34 is an interline image sensor, for example, in which photodiodes that are light receiving elements for performing photoelectric conversion and CCDs associated with the respective photodiodes are two dimensionally arranged on a plane. In addition, the image sensor has a transfer gate that functions as an analogue switch between a photodiode and the associated CCD. A microlens for collecting light is mounted on the front side (on the camera lens 32 side) of each photodiode. The image sensor is not limited to the interline image sensor. A full-frame transfer image sensor or a frame transfer image sensor may be used, in which CCDs themselves function as light receiving elements.

In the electronic controller 36, microcomputers, electronic circuits, etc. are used in combination, for example, and the electronic controller 36 adjusts the shutter speed and the capture frequency (a few dozens times per second, for example) of the camera 30 by controlling the open/close timing of the transfer gates that the image sensor 34 has. The electronic controller 36 performs gain control and correlated double sampling (CDS) on the data output from the output circuit of the image sensor 34.

The display device 40 is a dot matrix liquid crystal display panel, a dot matrix organic luminescent display panel, or the like, in which pixels are regularly arranged in a matrix arrangement. In such a panel, an active element for driving a pixel is disposed for each pixel, and the brightness value (the displayed color) according to the pixel value is controlled for each pixel. The number of pixels is 640×480 (VGA), 800×600 (SVGA), etc., for example. Note that the display device 40 may be a touch panel display that detects variation in voltage on the display surface to receive various inputs.

The composite image-generating device 1 is a microcomputer or a large-scale integrated circuit (LSI) in which a central processing unit (CPU), a random access memory (RAM), a read only memory (ROM), a flash memory, and an input/output interface are connected via an internal bus. A geometric conversion table 11 is stored in, for example, the flash memory of the composite image-generating device 1. The composite image-generating device 1 has an output image-generating section 21 as a functional block that functions when the CPU executes a system realization program that is stored in the ROM (which may be regarded as the "computer-readable medium" of the invention), which may be regarded as the "program" of the invention.

Figure 2:
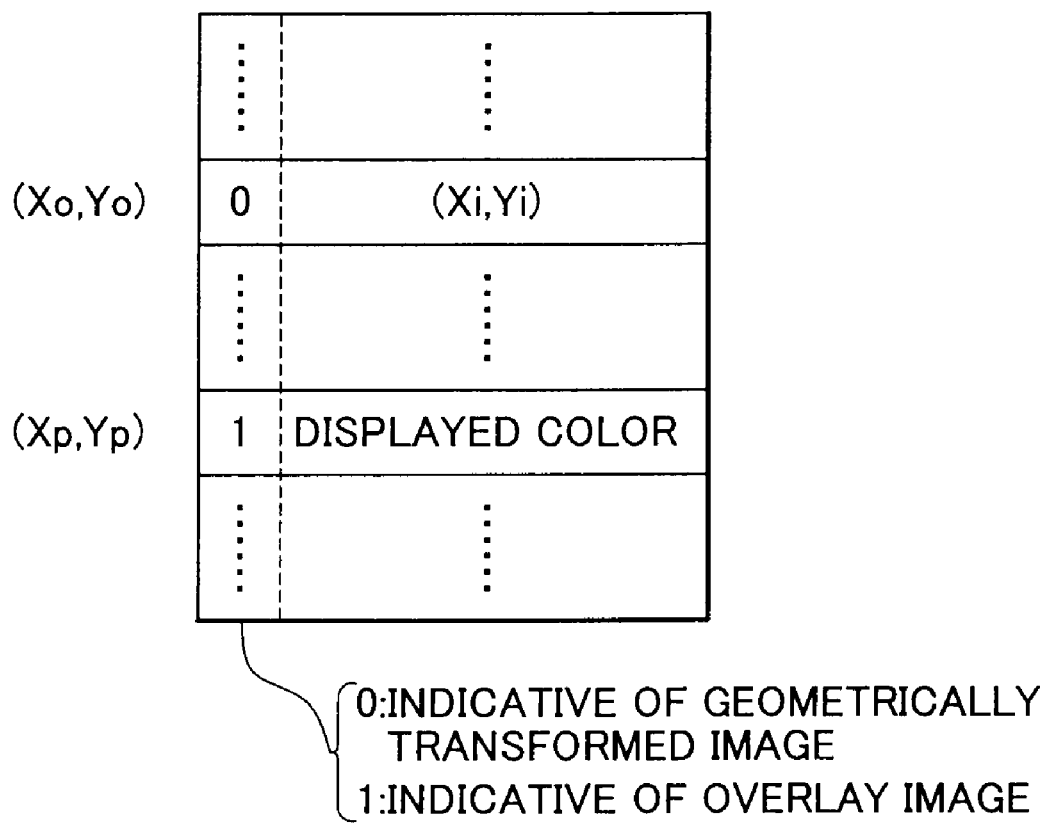
FIG. 2 is a diagram illustrating a geometric transformation table 11 of the first embodiment.

FIG. 2 is a diagram illustrating the geometric transformation table 11 of the first embodiment. The geometric transformation table 11 assigns coordinates corresponding to the positions of pixels of the output image displayed on the display device 40 on the input image that is captured by the camera 30. In other words, the geometric transformation table 11 may be considered as a table that defines a coordinate system, corresponding to the positions of pixels of the output image, on the input image captured by the camera 30. The elements of the geometric transformation table 11 are arranged in the order in which the raster scanning of the output image is performed (in the order of the coordinates of the output image), so that the coordinates (Xi, Yi) of the input image are retrieved when the geometric transformation table 11 is referred to with the use of the coordinates (Xo, Yo) of the pixel of the output image as input.

When the positions of pixels of the output image and the positions of pixels of the input image are in one-to-one correspondence, the coordinates (Xo, Yo) and the coordinates (Xi, Yi) are in one-to-one correspondence. However, in the case of the general geometric transformation of the invention described below, the positions of pixels of the output image and the positions of pixels of the input image are not in one-to-one correspondence, and therefore, there is a case where, although the coordinates (Xo, Yo) of the output image are integers, the coordinates (Xi, Yi) of the input image are real numbers that have decimal fractions.

FIG. 3 is a diagram showing the correspondences between the coordinates in the input image and the coordinates in the output image in the first embodiment of the invention. In FIG. 3, the intersection points of the grid represent the pixel positions in both of the input image and the output image. The coordinates (Xo, Yo) in the output image coincide with the positions of pixels, whereas the coordinates (Xi, Yi) in the input image do not coincide with the positions of pixels. However, when the correspondences are previously determined in this way, general geometric transformation (distortion correction in this embodiment) is realized.

Figure 4A:
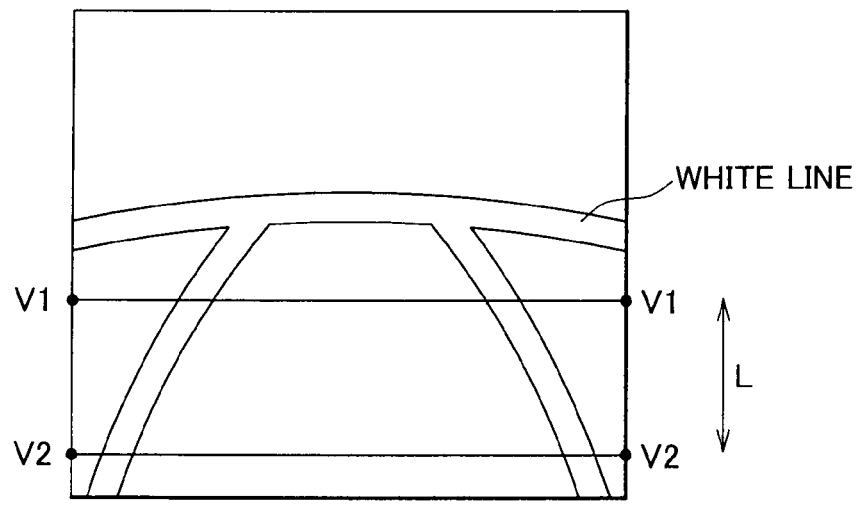
FIG. 4A is a diagram showing an example of an input image before distortion correction according to the first embodiment.
Figure 4B:
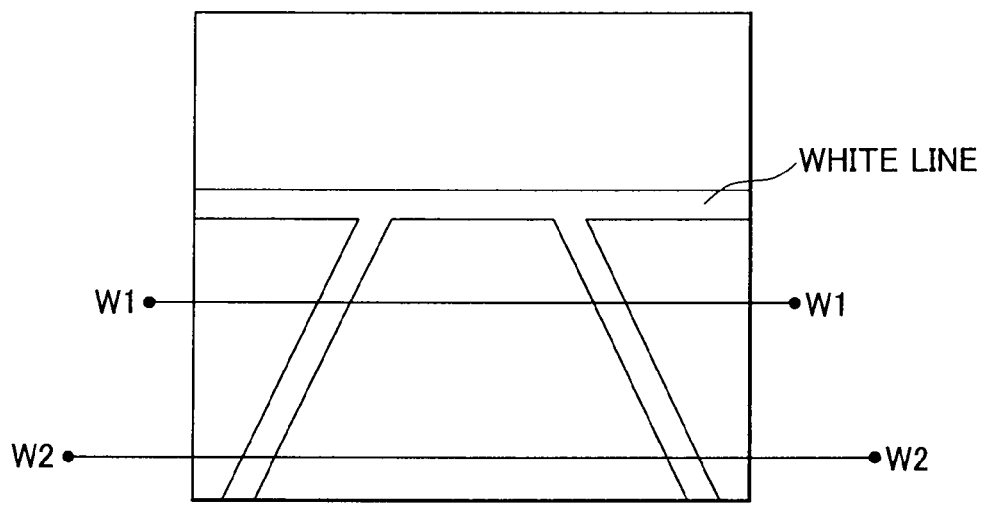
FIG. 4B is a diagram showing an example of an output image before distortion correction according to the first embodiment.

The correspondences between the coordinates (Xo, Yo) and the coordinates (Xi, Yi) will be briefly described. FIG. 4A is a diagram showing an example of an input image before distortion correction. FIG. 4B is a diagram showing an example of an output image before distortion correction. For example, when the degree of distortion increases with distance from the center of the image in the upper or lower direction, the positions of pixels of the input image and the positions of pixels of the output image that are associated with each other are shifted in the width direction in the distortion correction using geometric transformation, depending on the vertical position of the pixel. Specifically, the pixels on a line segment V1 and a line segment V2 are mapped to the pixels on a line segment W1 and a line segment W2, respectively, that have different lengths. When the amount of distortion per pixel (in the vertical direction in the input image) is α, and the number of pixels between the line segments V1 and V2 is L, the positions of the pixels on the line segment V2 are associated with the positions of the pixels on the line segment W2 so that the line segment W2 is longer than the line segment W1 by L·α. As a result, the correspondences between the coordinates (Xo, Yo) and the coordinates (Xi, Yi) are determined by a given coordinate transformation equation (high degree polynomial).

The correspondences related to such correction and transformation are stored in the ROM or the like of the composite image-generating device 1 prior to shipment of the vehicle, for example, and the values that are corrected with the height of the vehicle body taken into consideration as needed are read out to the flush memory or the like as the geometric transformation table 11.

Next, a method of determining the pixel value of the input image at coordinates (Xi, Yi) will be described with reference to FIGS. 2 and 3. The output image-generating section 21 determines the pixel value of the input image at coordinates (Xi, Yi) by performing so-called bilinear interpolation, which is an extension of linear interpolation to the two dimensional case, on the pixel values of the pixels that surround the point with the coordinates (Xi, Yi). Specifically, the pixel value obtained with the use of the following equation (1) is calculated as the pixel value of the input image at coordinates (Xi, Yi), and is set as the pixel value of the output image at coordinates (Xo, Yo). For the sake of simplicity, the length of one side of a unit lattice has a value "1" in the coordinate system defined on the input image. Note that such a method is merely an example, and the pixel value of the input image at coordinates (Xi, Yi) may be determined with the use of another method. When the position of a pixel of the input image coincides with coordinates (Xi, Yi), the original pixel value of the pixel of the input image may be used without performing such interpolation.

pixel value $(Xi, Yi) = \{G_1 \times (1-(\text{fractional part of } Xi)) + G_2 \times (\text{fractional part of } Xi)\} \times (\text{fractional part of } Yi) + \{G_3 \times (1-(\text{fractional part of } Xi)) + G_4 \times (\text{fractional part of } Xi)\} \times (1-\text{fractional part of } Yi)$  (1)

In addition, in the geometric transformation table 11 of the first embodiment, a selection flag that indicates which of the geometrically transformed image and the overlay image is displayed is included. The selection flag is set to the value "0" indicative of the geometrically transformed image, or to the value "1" indicative of the overlay image. With regard to the output coordinates ((Xp, Yp) in FIG. 2) for which the selection flag is set to the value "1", instead of, or in addition to, the corresponding coordinates of the input image, the specification of the color to be displayed (herein also referred to as the "displayed color") is entered. Specifically, overlay data (the selection flag and the displayed color in the first embodiment) are associated with the positions (coordinates) of the pixels of the output image.

Figure 5:
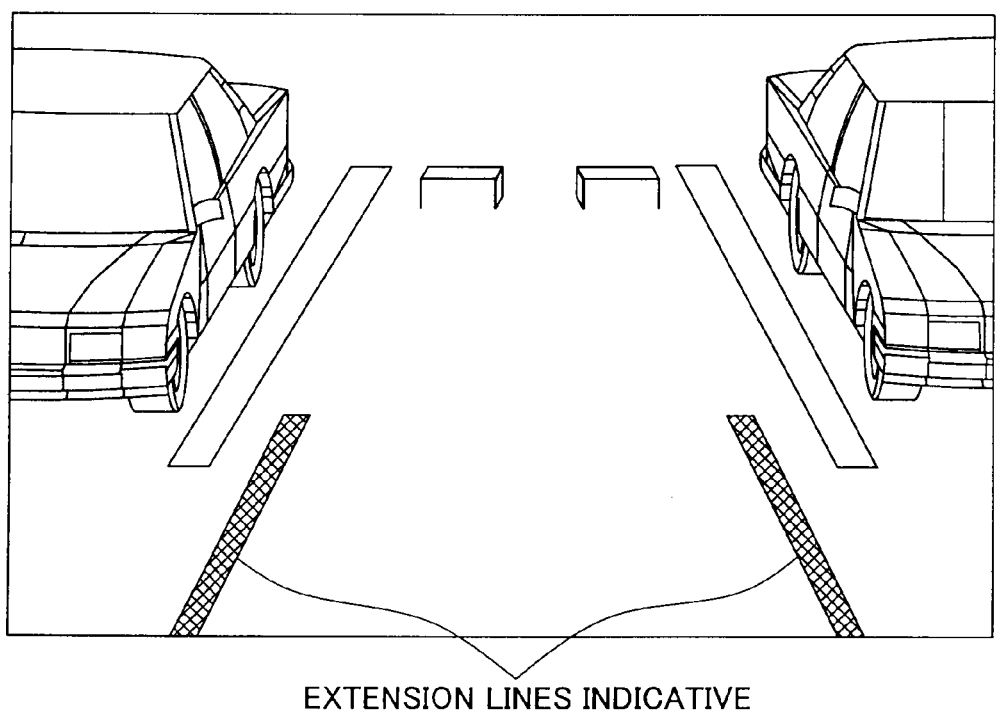
FIG. 5 is a diagram showing a situation in which extension lines indicating a vehicle width are superimposed on the image of a rear view from a vehicle for the use of a guide during a backward parking operation in the first embodiment.

With regard to specifying of the selection flag and specifying of the displayed color when the value of the selection flag is "1", the data previously stored in a ROM or the like may be automatically included in the geometric transformation table 11, or an external device may set the values as needed. A conceivable situation where the former is appropriate is a situation where, when a rear view from the vehicle is captured and displayed as in the case of the first embodiment, extension lines indicating the vehicle width are superimposed on the image of the rear view from the vehicle for the use of the guide during a backward parking operation, for example (see FIG. 5). A situation where the latter is appropriate is a situation where, when a front view from the vehicle is captured and displayed, for example, a route indication according to the route guidance provided by a navigation system is superimposed on the image of the front view from the vehicle, for example.

In the output image-generating section 21, the pixel value obtained with the use of the equation (1) as described above is set as the pixel value with regard to the pixel of the output image for which the value of the selection flag is "0", and the displayed color specified in the geometric transformation table 11 is set as the pixel value with regard to the pixel of the output image for which the value of the selection flag is "1". Thus, the output image is generated by superimposing the overlay image based on the overlay data associated with the positions of pixels of the output image in the geometric transformation table 11, on the image obtained by geometrically transforming the input image in accordance with the geometric transformation table 11.

Figure 6:
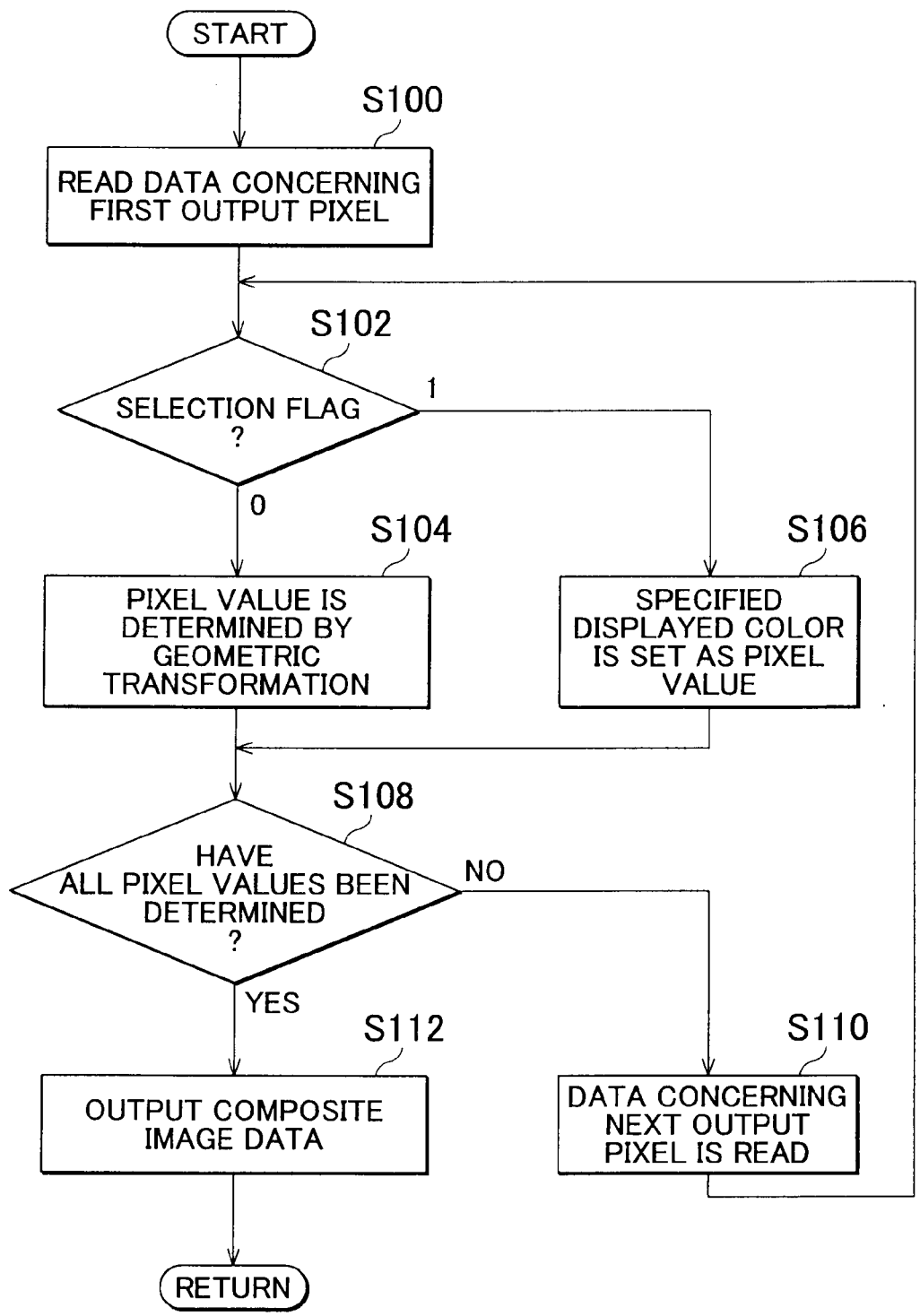
FIG. 6 is a flow chart showing a flow of a characteristic process performed by an output image-generating section 21 of the first embodiment.

FIG. 6 is a flow chart showing a flow of a characteristic process performed by the output image-generating section 21 of the first embodiment. The flow is repeatedly performed in a predetermined cycle, for example.

First, the output image-generating section 21 reads the data concerning the first output pixel in the geometric transformation table 11 (S100).

Then, the output image-generating section 21 determines whether the selection flag that is associated with the output pixel has the value "0" or "1" (S102). As described above, the pixel value obtained by geometric transformation (and interpolation) is set as the pixel value of the output image when the value of the selection flag is "0" (S104), while the displayed color specified in the geometric transformation table 11 is set as the pixel value of the output image when the value of the selection flag is "1" (S106).

Subsequently, it is determined whether the pixel values have been determined for all the output pixels (S108), and when the pixel values have not been determined for all the output pixels, the data concerning the next output pixel is read (S110), and the steps from S102 onward are performed.

On the other hand, when the pixel values have been determined for all the output pixels, the determined set of image data is output to the display device 40 as composite image data of one frame (S112).

With the composite image-generating device 1 according to the first embodiment, the overlay data for displaying an overlay image are associated with the positions of pixels of the output image in the geometric transformation table 11, and based on such associations, a process of superimposing the overlay image on the geometrically transformed image is performed, so that it is possible to perform general geometric transformation and superimposing of an overlay image with a single geometric transformation table 11. Thus, particularly in the case where a regular image is superimposed as the overlay image, it is possible to reduce costs required to realize the process of superimposing an overlay image on the image that is obtained by transforming the input image received from the capturing section, as compared to the case where an overlay image is superimposed after a geometrical transformation is performed.

A composite image-generating device 2 according to a second embodiment of the invention will be described below. The composite image-generating device 2 differs from the composite image-generating device 1 according to the first embodiment in that a blending process ($\alpha$-blending, for example) is performed when an overlay image is superimposed.

Figure 7:
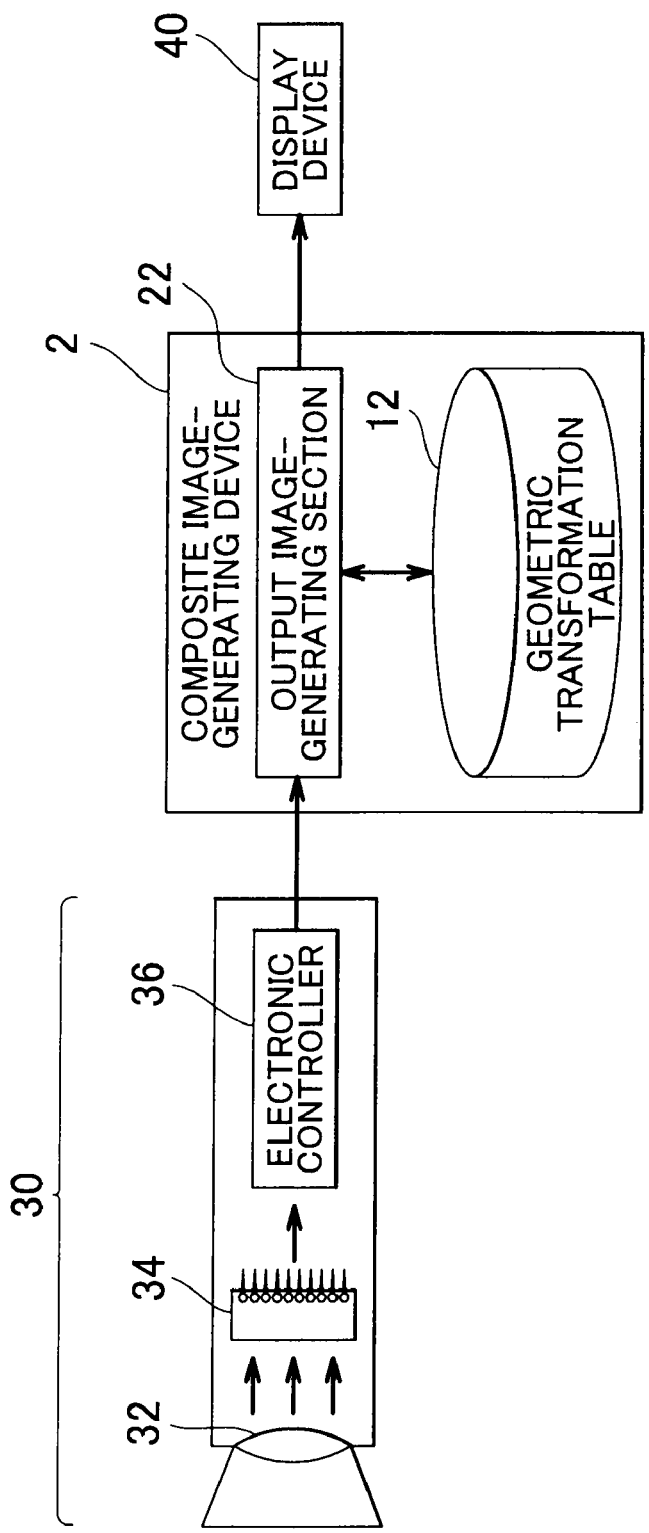
FIG. 7 is a diagram showing a composite image-generating device 2 according to a second embodiment of the invention, devices connected thereto, etc.

The composite image-generating device 2 of the second embodiment includes a geometric transformation table 12 and an output image-generating section 22 (see FIG. 7). The hardware components of the composite image-generating device 2, as well as the camera 30 and the display device 40 thereof are similar to those of the composite image-generating device 1 of the first embodiment, and therefore, description of these components is omitted. Furthermore, the geometric transformation is also similar to that of the first embodiment, and description thereof is omitted.

FIG. 8A is a diagram illustrating the geometric transformation table 12 of the second embodiment. The geometric transformation table 12 of the second embodiment includes a blend coefficient instead of, or in addition to, the selection flag included in the geometric transformation table 11 of the first embodiment. Specifically, overlay data (the blend coefficient in the second embodiment) are associated with the positions (coordinates) of the pixels of the output image. Note that also in the second embodiment, the selection flag may be included in the geometric transformation table 12 as in the case of the first embodiment.

The blending coefficient in the second embodiment is the blending coefficient $\alpha$ for the $\alpha$-blending process. Specifically, the blending coefficient section the opacity used when a translucent processing is performed, and is set between the values "0" and "1" inclusive. Note that the blending coefficient may be set beyond the range between the values "0" and "1" inclusive. With regard to specifying of the blending coefficient, the data previously stored in a ROM or the like may be automatically included in the geometric transformation table 12, or an external device may set the blending coefficient as needed.

The output image-generating section 22 calculates a pixel value with the use of the following equation (2), using the pixel value Ga that is obtained with the use of the equation (1) of the first embodiment, and the pixel value Gb that specifies the displayed color of the overlay image. As a result, the overlay image is displayed such that the transparency of the overlay image increases as the blending coefficient $\alpha$ decreases. With regard to the pixel of the output image for which the blending coefficient is set to the value "0" (or the blending coefficient is not set), the pixel value Ga obtained with the use of the above equation (1) is naturally used as the pixel value.

$$\text{pixel value } G = (1-\alpha) \times Ga + \alpha \times Gb \quad (2)$$

Thus, the output image is generated by superimposing the overlay image based on the overlay data associated with the positions of pixels of the output image in the geometric transformation table 12 on the image obtained by geometrically transforming the input image in accordance with the geometric transformation table 12.

Figure 9:
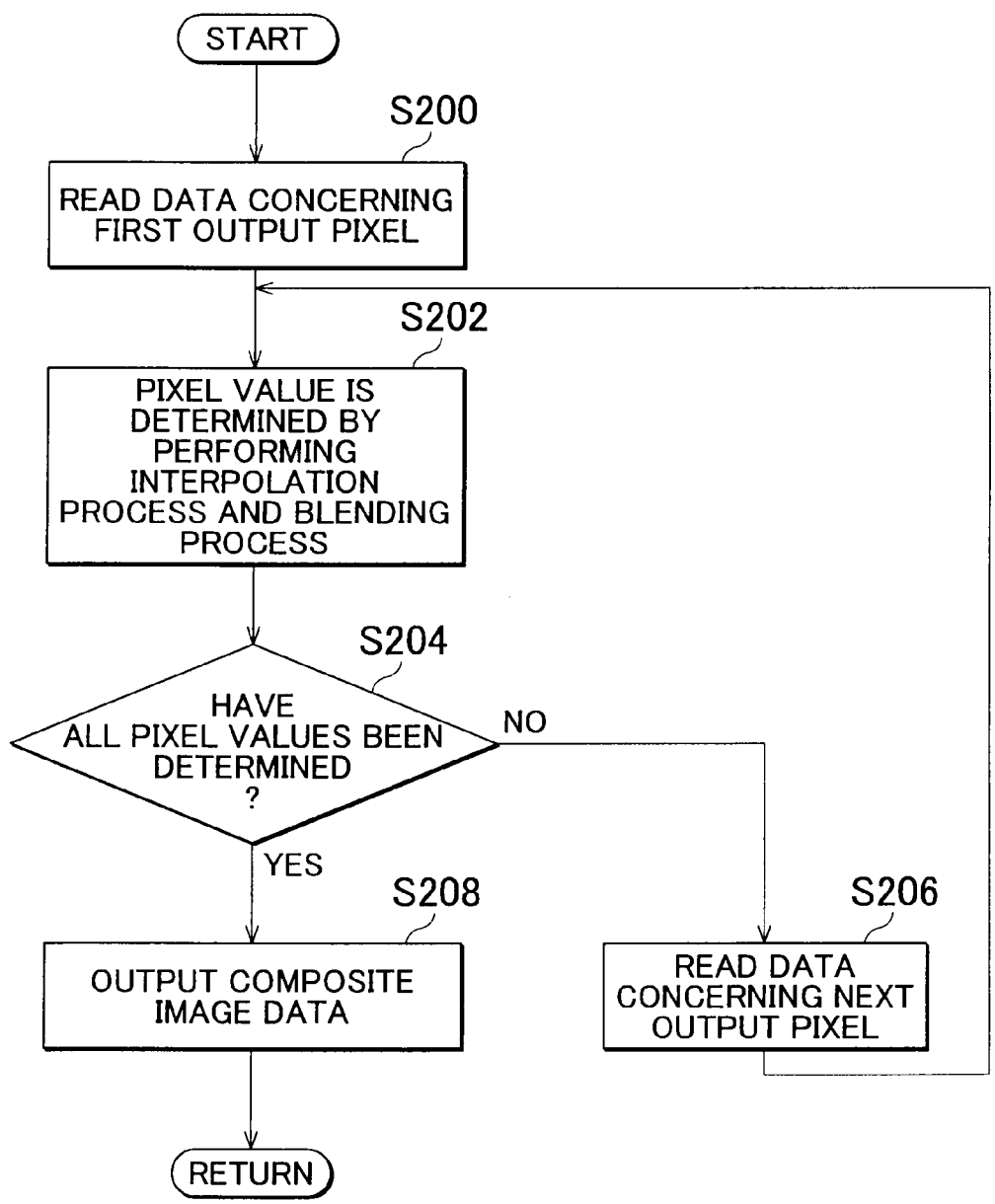
FIG. 9 is a flow chart showing a flow of a characteristic process performed by an output image-generating section 22 of the second embodiment.

FIG. 9 is a flow chart showing a flow of a characteristic process performed by the output image-generating section 22 of the second embodiment. The flow is repeatedly performed in a predetermined cycle, for example.

First, the output image-generating section 22 reads the data concerning the first output pixel in the geometric transformation table 12 (S200).

Then, the pixel value calculated with the use of the above equation (2) is set as the pixel value of the output image (S202). Specifically, the pixel value of the output image is determined by performing the interpolation process and the blending process.

Subsequently, it is determined whether the pixel values have been determined for all the output pixels (S204), and when the pixel values have not been determined for all the output pixels, the data concerning the next output pixel is read (S206), and the steps from S202 onward are performed. On the other hand, when the pixel values have been determined for all the output pixels, the determined set of image data is output to the display device 40 as composite image data of one frame (S208).

According to the composite image-generating device 2 of the second embodiment, as in the case of the composite image-generating device 1 of the first embodiment, it is possible to reduce costs required to realize the process of superimposing an overlay image on the image that is obtained by transforming the input image received from the capturing section, and in addition, it is possible to combine the geometrically transformed image and the overlay image after translucent processing thereof, perform the antialiasing process, etc.

In the second embodiment, the displayed color of an overlay image may be specified with the use of the geometric transformation table 12 for each pixel. An example of the geometric transformation table 12 of this case is shown in FIG. 8B. Also in this case, the above equation (2) can be used provided that the pixel value Gb is read out from the geometric transformation table 12 for each pixel.

A composite image-generating device 3 according to a third embodiment of the invention will be described below. The composite image-generating device 3 differs from the composite image-generating device 1 according to the first embodiment in that part of or all of the pixel values of the pixels that surround a point with the coordinates assigned on the input image are replaced by displayed color included in the overlay data to perform the superimposing of an overlay image.

Figure 10:
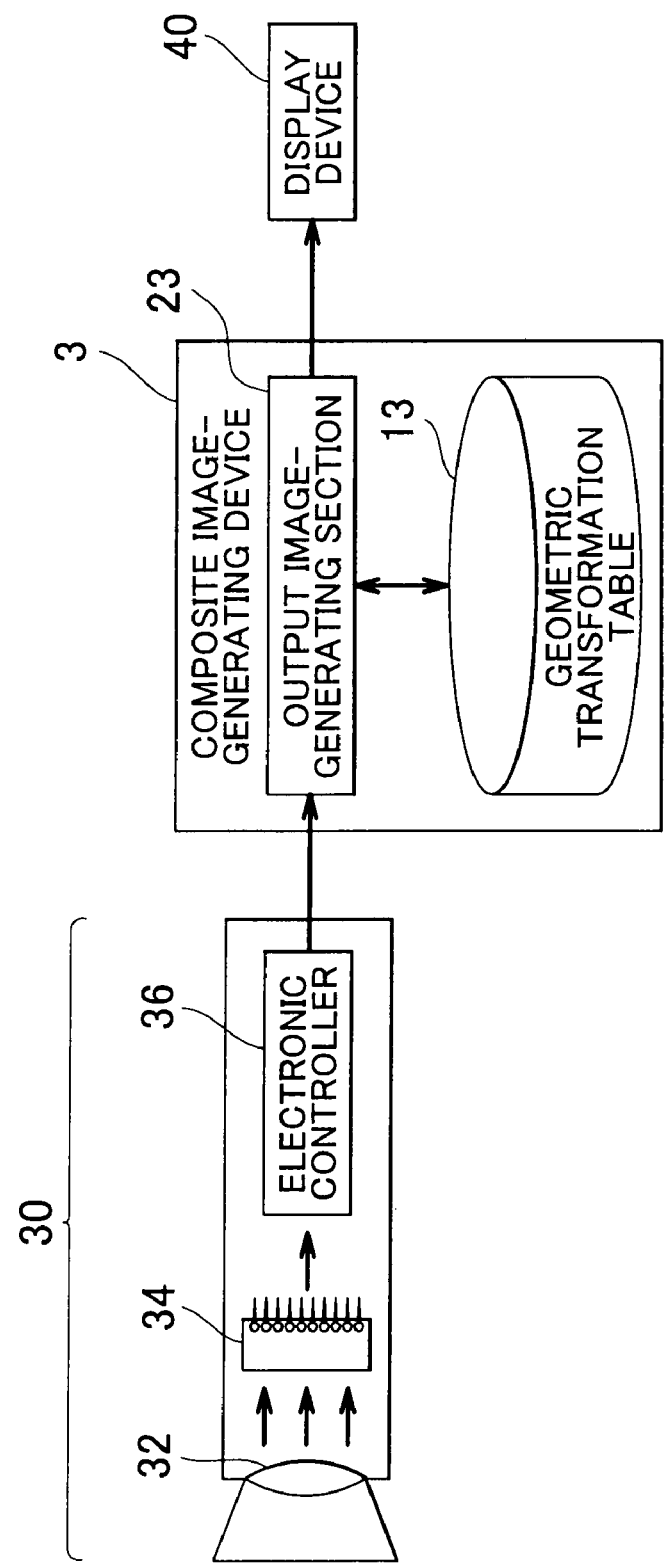
FIG. 10 is a diagram showing a composite image-generating device 3 according to a third embodiment of the invention, devices connected thereto, etc.

The composite image-generating device 3 of the third embodiment includes a geometric transformation table 13 and an output image-generating section 23 (see FIG. 10). The hardware components of the composite image-generating device 3, as well as the camera 30 and the display device 40 thereof are similar to those of the composite image-generating device 1 of the first embodiment, and therefore, description of these components is omitted.

Figure 11:
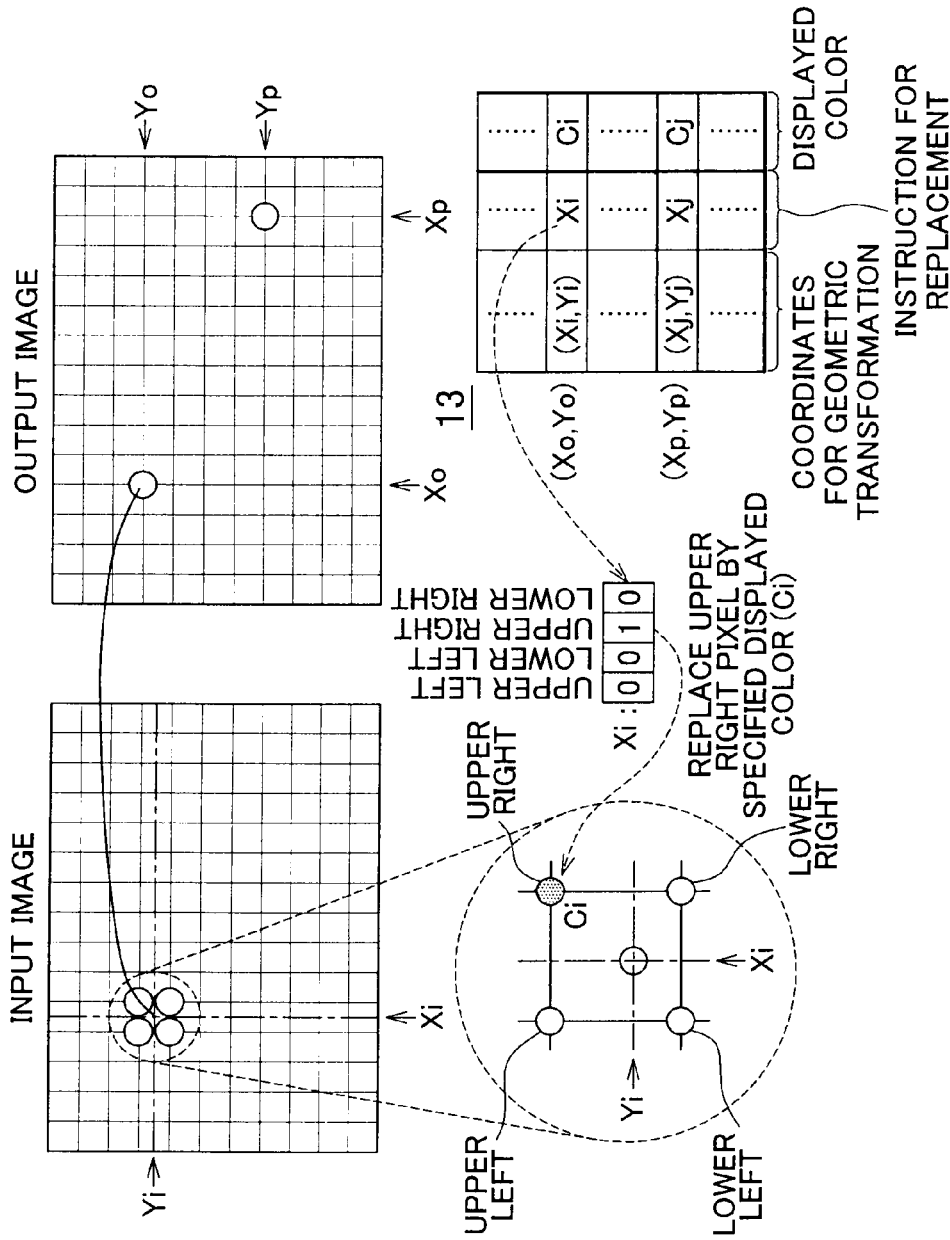
FIG. 11 is a diagram illustrating a geometric transformation table 13, and the correspondences between coordinates in an input image and coordinates in an output image in the third embodiment.

Because superimposing of an overlay image is incorporated in the geometric transformation process of the first and second embodiments, these processes will be collectively described. FIG. 11 is a diagram illustrating the geometric transformation table 13 and the correspondences between the coordinates in the input image and the coordinates in the output image in the third embodiment. The geometric transformation table 13 assigns coordinates corresponding to the positions of pixels of the output image displayed on the display device 40 on the input image that is captured by the camera 30. In addition, the geometric transformation table 13 of the third embodiment includes the displayed color and replacement instructions to instruct which pixel values are to be replaced by the specified displayed color, of the pixels that surround a point with the coordinates assigned on the input image.

The replacement instructions are provided as 4-bit data corresponding to the pixels that surround the point with the coordinates assigned on the input image, for example. Specifically, the first bit indicates whether the pixel value of the upper left pixel is to be replaced by the displayed color ("0" when the replacement is to be made, and "1" when the replacement is not to be made), the second bit indicates whether the pixel value of the lower left pixel is to be replaced by the displayed color, the third bit indicates whether the pixel value of the upper right pixel is to be replaced by the displayed color, and the fourth bit indicates whether the pixel value of the lower right pixel is to be replaced by the displayed color. In this way, it is possible to achieve the effect similar to that achieved when the blending coefficient is specified in a predetermined number of levels as in the case of the second embodiment. Specifically, when the first to fourth bits all have the value "1", the result is the same as that when the blending coefficient is set to 1 in the second embodiment, and when one, two, or three of the first to fourth bits are set to the value "1", the result is the same as that when the blending coefficient is specified in three levels (the blending coefficient can be arbitrarily specified in the second embodiment). Thus, when it is taken into consideration that because the need to perform calculation of the above equation (2) is eliminated, the processing load can be reduced accordingly, it can be said that the composite image-generating device 3 of the third embodiment can combine the geometrically transformed image and the overlay image after translucent processing thereof, perform the antialiasing process, etc. with more simple operation even though the accuracy is inferior to that of the composite image-generating device 2 of the second embodiment.

With regard to replacement instructions, and specification of the displayed color, the data previously stored in a ROM or the like may be automatically included in the geometric transformation table 13, or an external device may determine the replacement and the displayed color as needed. Furthermore, the distortion correction is similar to that of the first embodiment, and description thereof is omitted.

As in the case of the first embodiment, the output image-generating section 23 determines the pixel value of the input image at a point with coordinates (Xi, Yi) by performing interpolation using the above equation (1) based on the pixel values (the specified displayed colors when the pixel values are replaced by the colors as described above) of the pixels that surround the point with coordinates (Xi, Yi). Thus, the output image is generated by superimposing the overlay image based on the overlay data associated with the positions of pixels of the output image in the geometric transformation table 13 on the image obtained by geometrically transforming the input image in accordance with the geometric transformation table 13.

Figure 12:
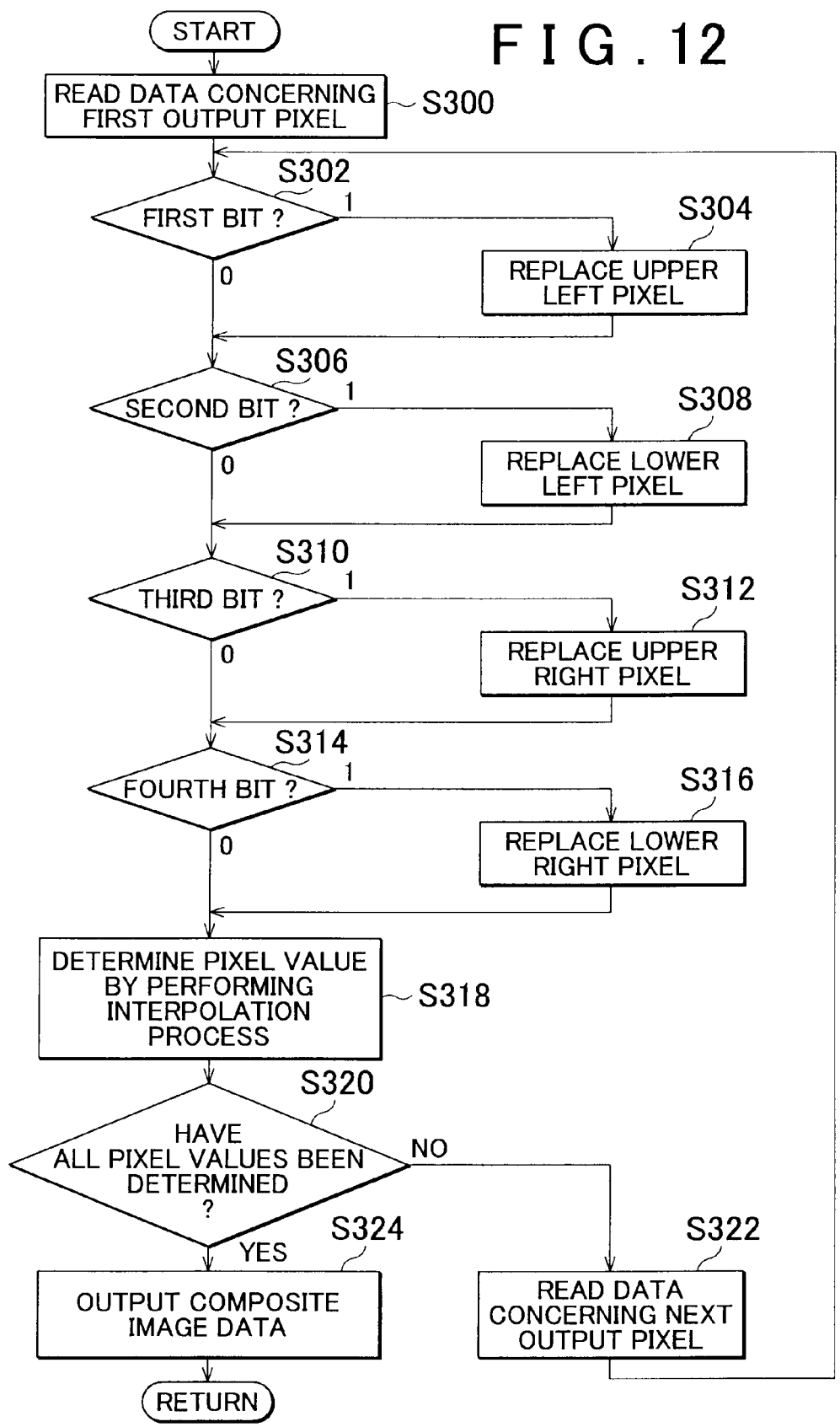
FIG. 12 is a flow chart showing a flow of a characteristic process performed by an output image-generating section 23 of the third embodiment.

FIG. 12 is a flow chart showing a flow of a characteristic process performed by the output image-generating section 23 of the third embodiment. The flow is repeatedly performed in a predetermined cycle, for example.

First, the output image-generating section 23 reads the data concerning the first output pixel in the geometric transformation table 13 (S300).

Then, it is determined whether the first bit of the replacement instruction associated with the output pixel concerned has the value "1" (S302), and when the first bit has the value "1", of the pixel values of the pixels that surround the point with the coordinates (Xi, Yi) of the input image, the pixel value of the upper left pixel is replaced by the displayed color (S304). Next, it is determined whether the second bit has the value "1" (S306), and when the second bit has the value "1", the pixel value of the lower left pixel is replaced by the displayed color (S308). Next, it is determined whether the third bit has the value "1" (S310), and when the third bit has the value "1", the pixel value of the upper right pixel is replaced by the displayed color (S312). Next, it is determined whether the fourth bit has the value "1" (S314), and when the fourth bit has the value "1", the pixel value of the lower right pixel is replaced by the displayed color (S316).

Then, the pixel value obtained by performing interpolation using the data after replacement (original data when there is no replacement instruction) is set as the pixel value of the pixel concerned of the output image (S318).

Subsequently, it is determined whether the pixel values have been determined for all the output pixels (S320), and when the pixel values have not been determined for all the output pixels, the data concerning the next output pixel is read (S322), and the steps from S302 onward are performed.

On the other hand, when the pixel values have been determined for all the output pixels, the determined set of image data is output to the display device 40 as composite image data of one frame (S324).

According to the composite image-generating device 3 of the third embodiment, as in the case of the composite image-generating device 1 of the first embodiment, it is possible to reduce cost required to realize the process of superimposing an overlay image on the image obtained by transforming the input image received from the capturing section, and in addition, although the accuracy is inferior to that of the second embodiment, it is possible to combine the geometrically transformed image and the overlay image after translucent processing thereof, perform the antialiasing process, etc., through more simple operation than that of the second embodiment.

A composite image-generating device 4 according to a fourth embodiment of the invention will be described below. The composite image-generating device 4 differs from the composite image-generating device 1 according to the first embodiment in that part of the pixel values of the pixels that surround a point with the coordinates assigned on the input image are replaced by the displayed color included in the overlay data.

Figure 13:
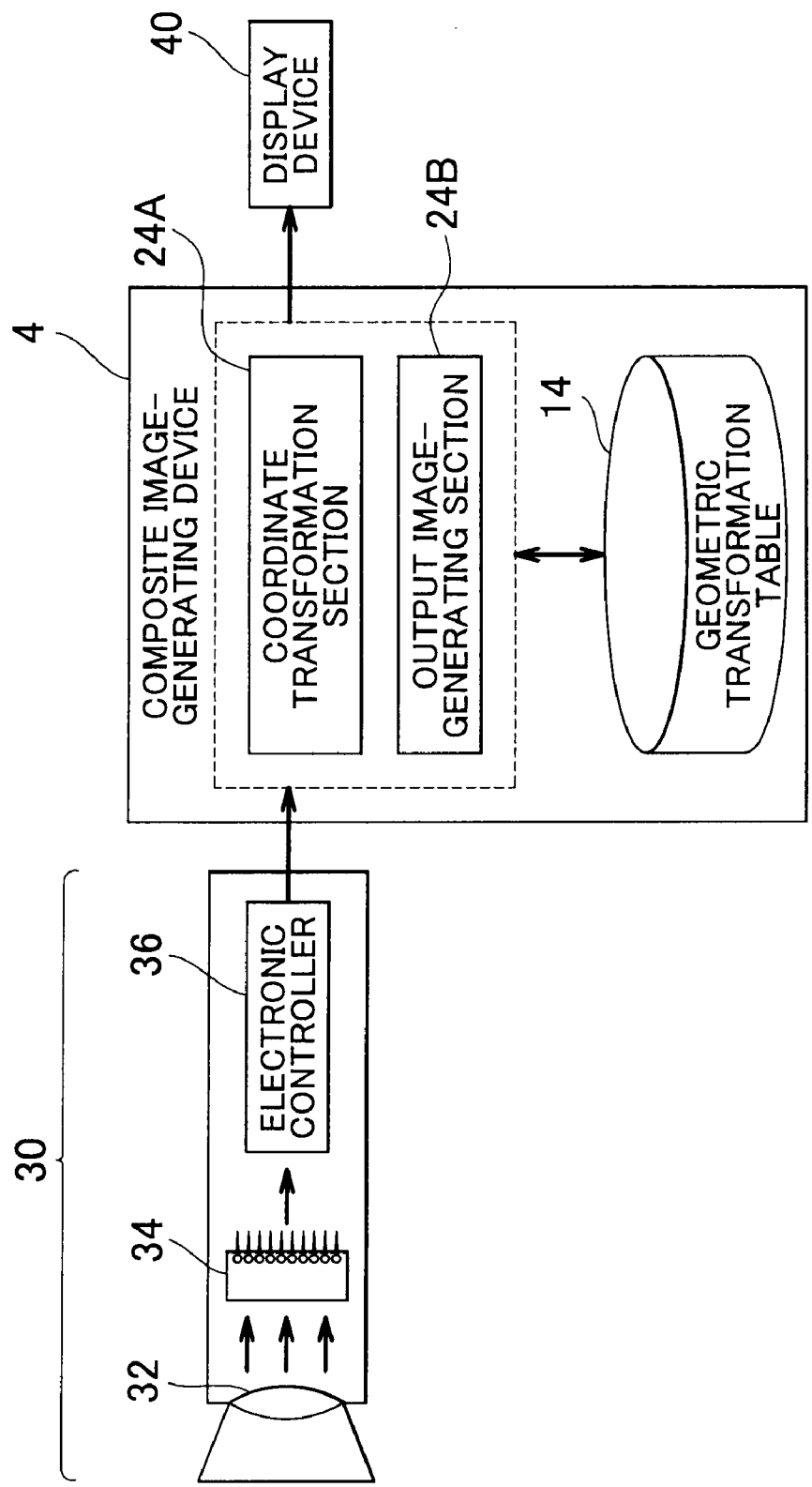
FIG. 13 is a diagram showing a composite image-generating device 4 according to a fourth embodiment of the invention, devices connected thereto, etc.

The composite image-generating device 4 of the fourth embodiment includes a geometric transformation table 14, a coordinate transformation section 24A, and an output image-generating section 24B (see FIG. 13). The hardware components of the composite image-generating device 4, as well as the camera 30 and the display device 40 thereof are similar to those of the composite image-generating device 1 of the first embodiment, and therefore, description of these components is omitted.

FIG. 14 is a diagram illustrating the geometric transformation table 14 of the fourth embodiment. The geometric transformation table 14 assigns coordinates corresponding to the positions of pixels of the output image displayed on the display device 40 on the input image that is captured by the camera 30. In addition, the geometric transformation table 14 of the fourth embodiment includes the displayed color.

The coordinate transformation section 24A converts the fractional part of the row direction (Y direction) coordinate of the coordinates (Xi, Yi) of the input image that correspond to certain coordinates (the coordinates for which the displayed color is set, for example) of the output image, into the blending coefficient α with the use of a given program or the like.

Figure 15A:
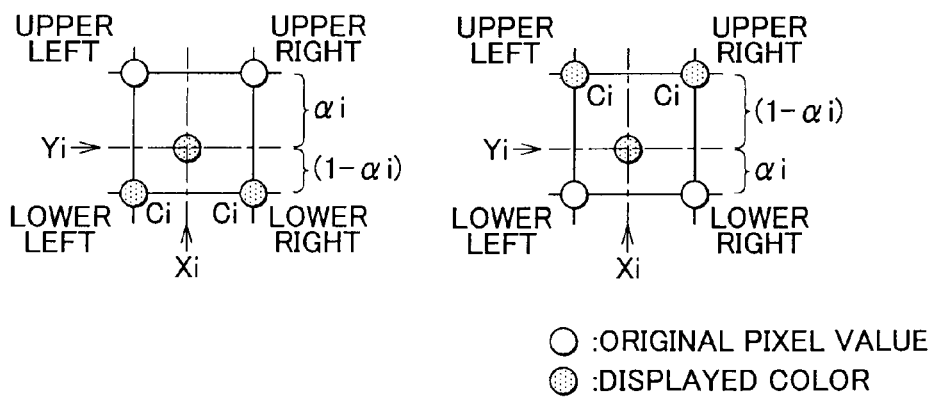
FIG. 15A is a diagram showing a situation in which an output image-generating section 24B according to the fourth embodiment replaces, by displayed color, pixel values of part of pixels that surround a point with coordinates, of which fractional part is converted, in an input image, the point corresponding to a pixel of an output image.
Figure 15B:
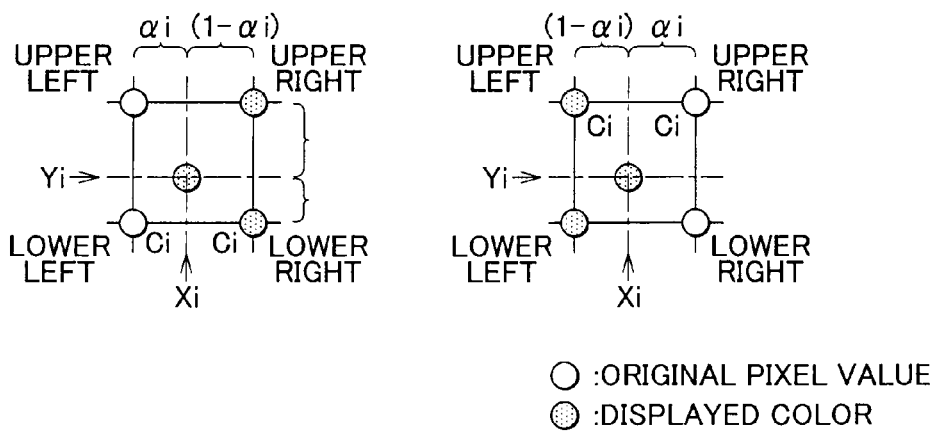
FIG. 15B is a diagram showing a situation in which the output image-generating section 24B according to the fourth embodiment replaces, by displayed color, pixel values of different part of pixels that surround the point with the coordinates, of which fractional part is converted, in the input image, the point corresponding to the pixel of the output image.

In this case, with regard to the pixel of the output image for which the fractional part of the coordinate is converted, the output image-generating section 24B performs interpolation after the pixel values of two pixels, lining up in the column direction (X direction), of the pixels that surround the point, represented by the coordinates (Xi, Yi) of the input image, that corresponds to the pixel concerned of the output image, are replaced by the displayed color, and the pixel value obtained by performing interpolation according to the above equation (1) using the data after replacement is set as the pixel value of the pixel concerned of the output image (see FIG. 15A).

In this way, the pixel value that is replaced by the displayed color is weighted with the blending coefficient α and reflected on the pixel value of the output image (see the above equation (1)). Thus, the output image is generated by superimposing an overlay image based on the overlay data associated with the positions of pixels of the output image in the geometric transformation table 14 on the image obtained by geometrically transforming the input image in accordance with the geometric transformation table 14.

Of the pixels that surround a point with the coordinates (Xi, Yi) of the input image, two pixels that line up in the column direction (X direction) are the two pixels on the upper side of the point with the coordinates (Xi, Yi), or the two pixels on the lower side thereof, and therefore, it is necessary to decide which two pixels are to be subjected to the pixel value replacement. In this regard, the two pixels may be fixed to either those on the upper side or those on the lower side. Alternatively, a configuration may be adopted in which the pixel values of the upper two pixels are replaced when the fractional part of the coordinate subjected to conversion is equal to or greater than 0.5, while the lower two pixels are replaced when the fractional part is less than 0.5. With this configuration, it is possible to leave unchanged the pixel value of the pixel with greater weight, of the pixels of the input image.

Alternatively, a configuration may be adopted in which, instead of always replacing the pixel values of two pixels, lining up in the column direction (X direction), of the pixels that surround the point with coordinates (Xi, Yi) of the input image, the replacement is not performed when the blending coefficient α (the fractional part) is less than the threshold value α1, while the pixel values of all the pixels that surround the point with the coordinates (Xi, Yi) of the input image are replaced by the displayed color when the blending coefficient α (the fractional part) is greater than α2 (α1<α2).

The coordinate transformation section 24A may convert the fractional part of the column direction (X direction) coordinate of the coordinates (Xi, Yi) of the input image that correspond to a certain point with coordinates (the coordinates of the pixel for which the displayed color is set, for example) of the output image, into the blending coefficient α with the use of a given program or the like. In this case, with regard to the pixel of the output image for which the fractional part of the coordinate is converted, the output image-generating section 24B performs interpolation after the pixel values of two pixels, lining up in the row direction (Y direction), of the pixels that surround the point, represented by the coordinates (Xi, Yi) of the input image, that corresponds to the pixel concerned of the output image, are replaced by the displayed color.

Also when the fractional part of the coordinate in the column direction (X direction) is converted into the blending coefficient α, the side on which replacement is performed may be fixed to the right side or to the left side as in the case where the fractional part of the coordinate in the row direction (Y direction) is converted into the blending coefficient α; however, a configuration may be adopted in which the right side two pixels are replaced when the fractional part of the coordinate subjected to conversion is equal to or greater than 0.5, and the left side two pixels are replaced when the fractional part thereof is less than 0.5. Alternatively, a configuration may be adopted in which, instead of always replacing the pixel values of two pixels, lining up in the column direction (X direction), of the pixels that surround the point with coordinates (Xi, Yi) of the input image, the replacement is not performed when the blending coefficient α (the fractional part) is less than the threshold value α1, while the pixel values of all the pixels that surround the point with the coordinates (Xi, Yi) of the input image are replaced by the displayed color when the blending coefficient α (the fractional part) is greater than α2 (α1<α2).

With regard to specifying of the displayed color, the data previously stored in a ROM or the like may be automatically included in the geometric transformation table 14, or an external device may determine the displayed color as needed.

Figure 16:
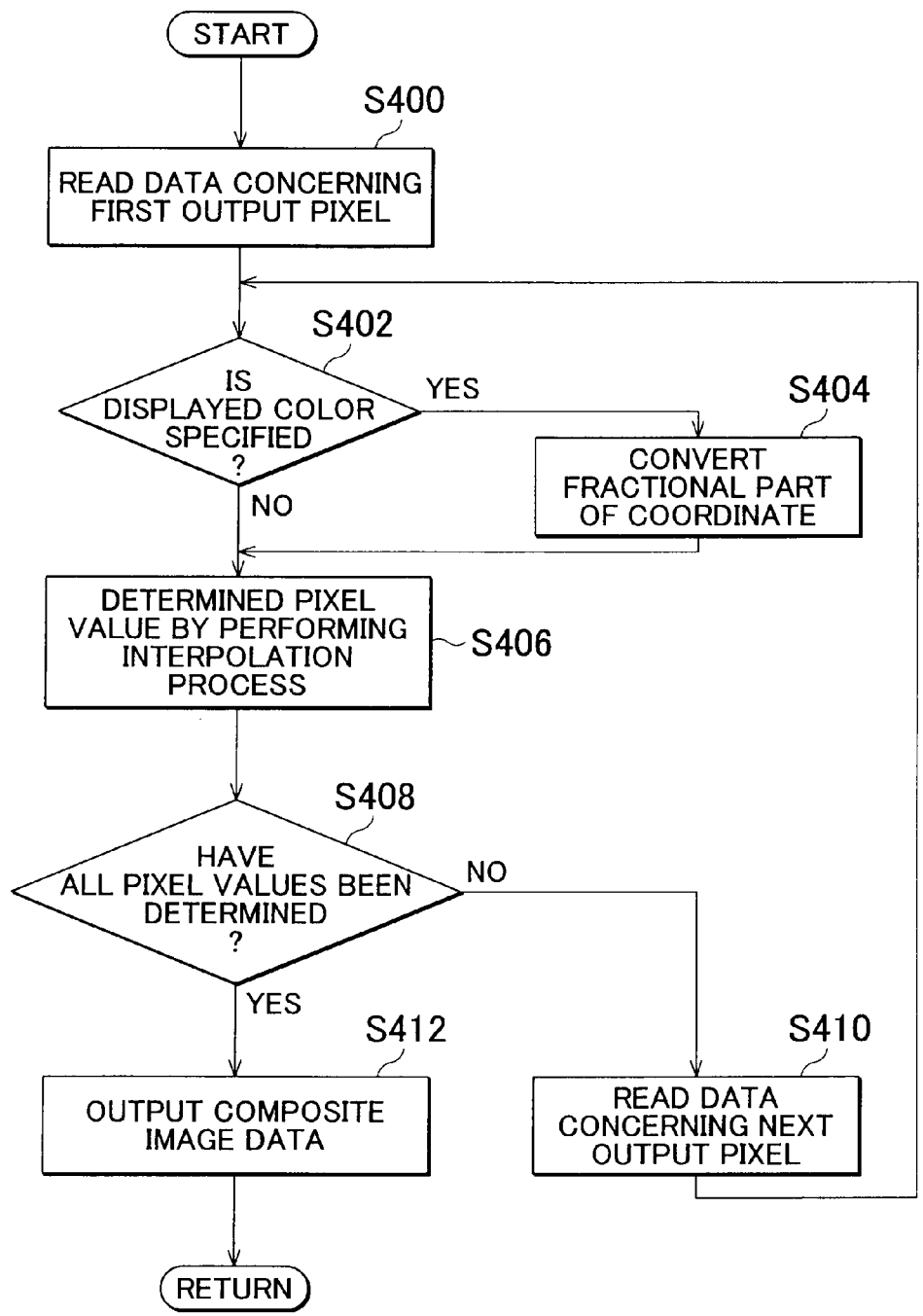
FIG. 16 is a flow chart showing a flow of a characteristic process performed by a coordinate transformation section 24A and the output image-generating section 24B of the fourth embodiment.

FIG. 16 is a flow chart showing a flow of a characteristic process performed by the coordinate transformation section 24A and the output image-generating section 24 of the fourth embodiment. The flow is repeatedly performed in a predetermined cycle, for example.

First, the coordinate transformation section 24A reads the data concerning the first output pixel in the geometric transformation table 14 (S400).

Next, it is determined whether the displayed color is specified for the output pixel concerned (S402), and when the displayed color is specified, the fractional part of the coordinate in the row direction (Y direction) of the coordinates (Xi, Yi) of the input image that correspond to coordinates of the output image that is read according to the above described method, is converted into the blending coefficient α (S404).

The output image-generating section 24B sets, as the pixel value of the output image, the pixel value obtained by performing interpolation using the data after replacement (original data when there is no replacement instruction) (S406).

Subsequently, it is determined whether the pixel values have been determined for all the output pixels (S408), and when the pixel values have not been determined for all the output pixels, the data concerning the next output pixel is read (S410), and the steps from S402 onward are performed.

On the other hand, when the pixel values have been determined for all the output pixels, the determined set of image data is output to the display device 40 as composite image data of one frame (S412).

According to the composite image-generating device 4 of the fourth embodiment, as in the case of the composite image-generating device 1 of the first embodiment, it is possible to reduce costs required to realize the process of superimposing an overlay image on the image that is obtained by transforming the input image received from the capturing section, and in addition, it is possible to combine the geometrically transformed image and the overlay image after translucent processing thereof, perform the antialiasing process, etc. In addition, because it is possible to omit the field for the blending coefficient in the geometric transformation table 14, it is possible to prevent the size of the geometric transformation table 14 from becoming too large.

A composite image-generating device 5 according to a fifth embodiment of the invention will be described below. The composite image-generating device 5, which is an embodiment showing a specific and simple configuration of the output image-generating section 21, realizes functions similar to those of the composite image-generating device 2 according to the second embodiment, which can specify the displayed color of the overlay image with the use of the geometric transformation table 12. Specifically, the composite image-generating device 5 performs the so-called bilinear interpolation, and at the same time, performs the blending process according to the above equation (2).

Figure 17:
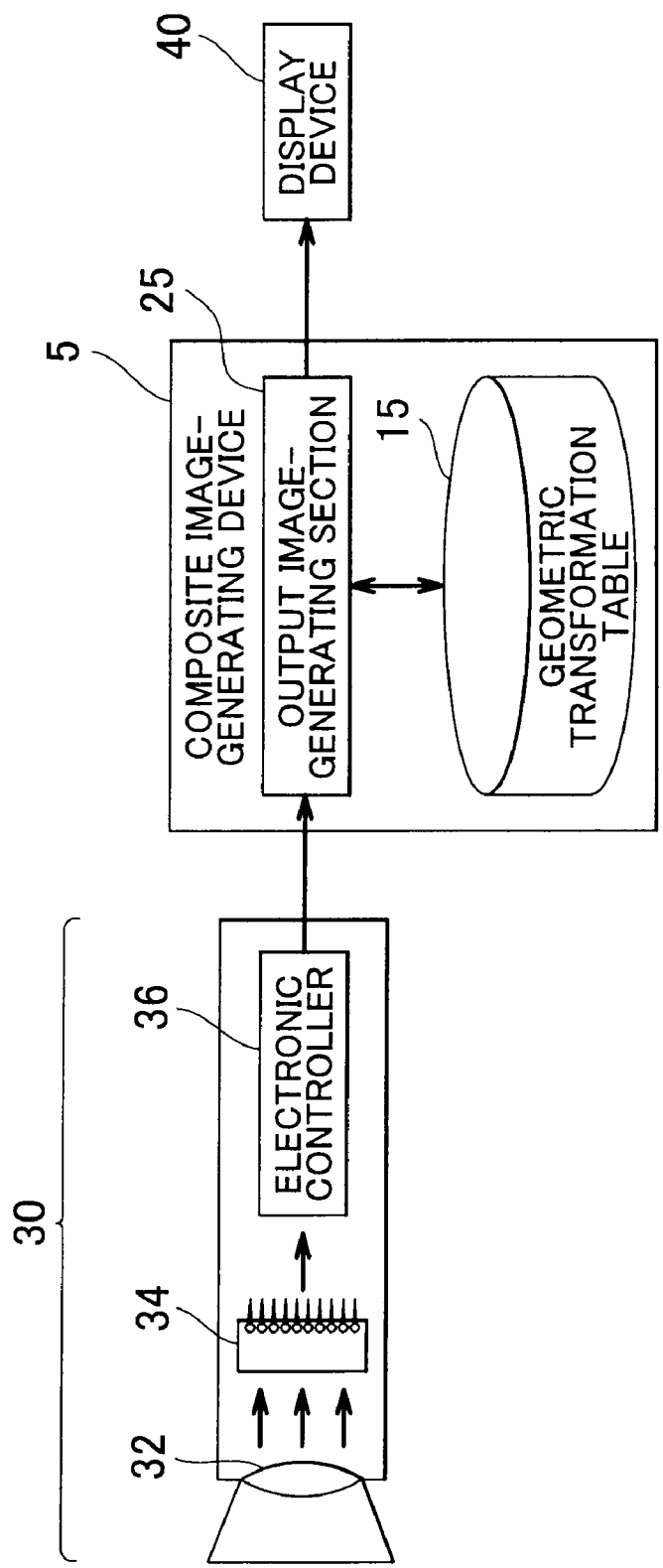
FIG. 17 is a diagram showing a composite image-generating device 5 according to a fifth embodiment of the invention, devices connected thereto, etc.

The composite image-generating device 5 of the fifth embodiment includes a geometric transformation table 15 and an output image-generating section 25 (see FIG. 17). The composite image-generating device 5 of the fifth embodiment is not necessarily an advanced computer system, and has only to have a storage medium in which the geometric transformation table 15 is stored, and the output image-generating section 25 with the hardware configuration described below. The contents of the geometric transformation table 15 are the same as those shown in FIG. 8B.

Figure 18:
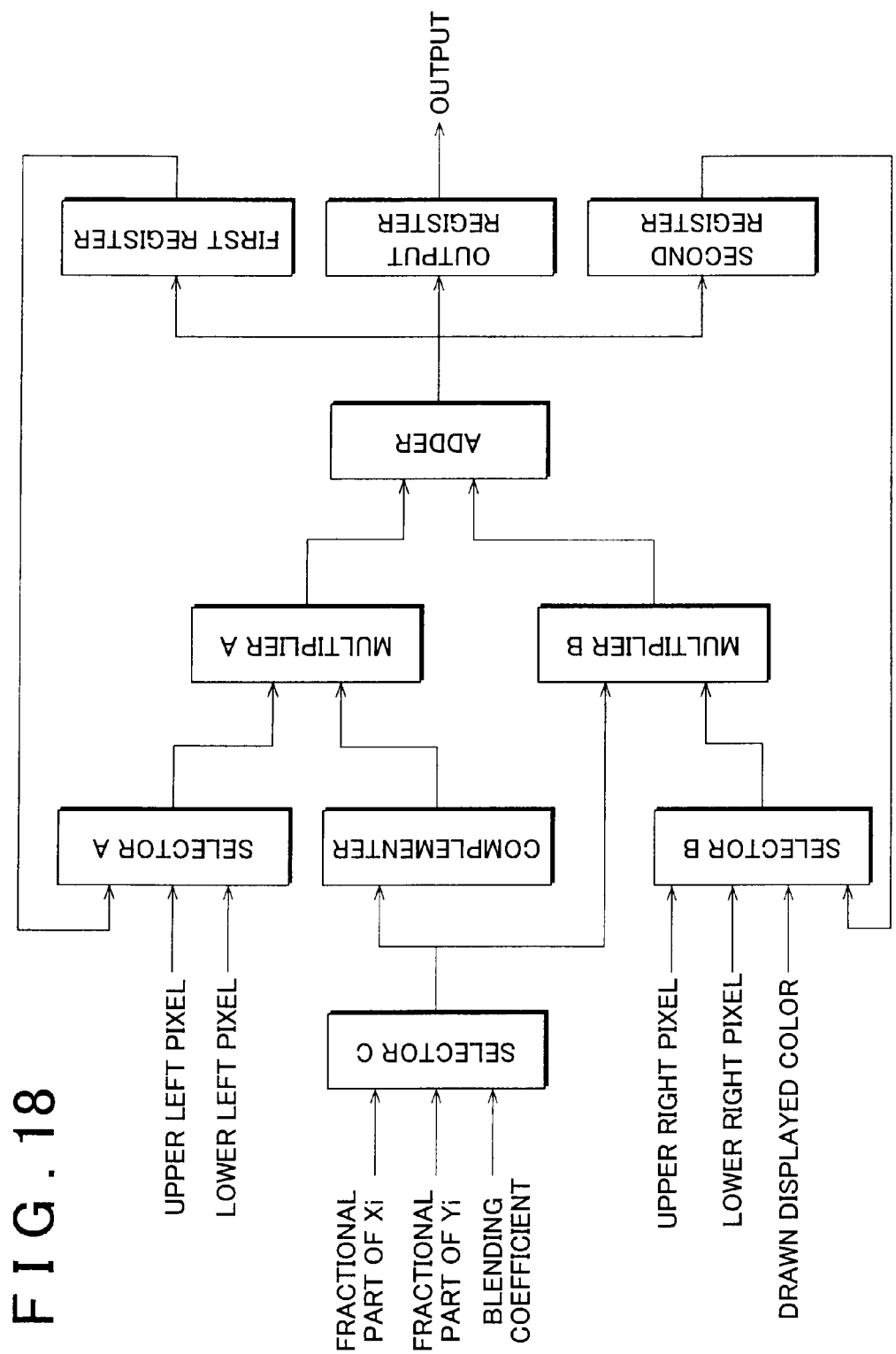
FIG. 18 is a diagram showing an example of a hardware configuration of an output image-generating section 25 of the fifth embodiment.

FIG. 18 is a diagram showing an example of the hardware configuration of the output image-generating section 25 of the fifth embodiment. Such a configuration is devised so that the geometric transformation process and the blending process are realized by providing a calculator for calculating the value weighted with internal division ratio and using the calculator four times, in consideration of the fact that the geometric transformation process and the blending process both are the calculation in which two values are weighted with the internal division ratio (internal division point calculation). With this configuration, it is possible to implement the geometric transformation process and the blending process with the use of a simple hardware configuration (without using an advanced computer system), and it is therefore possible to reduce the size and costs of the device.

In the following description, the bilinear interpolation is divided into steps, the interpolation value of the upper pixels with respect to the X direction is referred to as the first interpolation value, the interpolation value of the lower pixels with respect to the X direction is referred to as the second interpolation value, and the interpolation value of the first and second interpolation values with respect to the Y direction is referred to as the third interpolation value.

The output image-generating section 25 includes a selector A, a selector B, a selector C, a complementer, a multiplier A, a multiplier B, an adder, a first register, a second register, and an output register. The selector A receives an upper left pixel value, a lower left pixel value, and the value of the first register. The selector B receives an upper right pixel value, a lower right pixel value, and the value of the second register. The selector C receives fractional part of Xi and Yi of the coordinates (Xi, Yi) that are assigned on the input image, and the blending coefficient.

Figure 19:
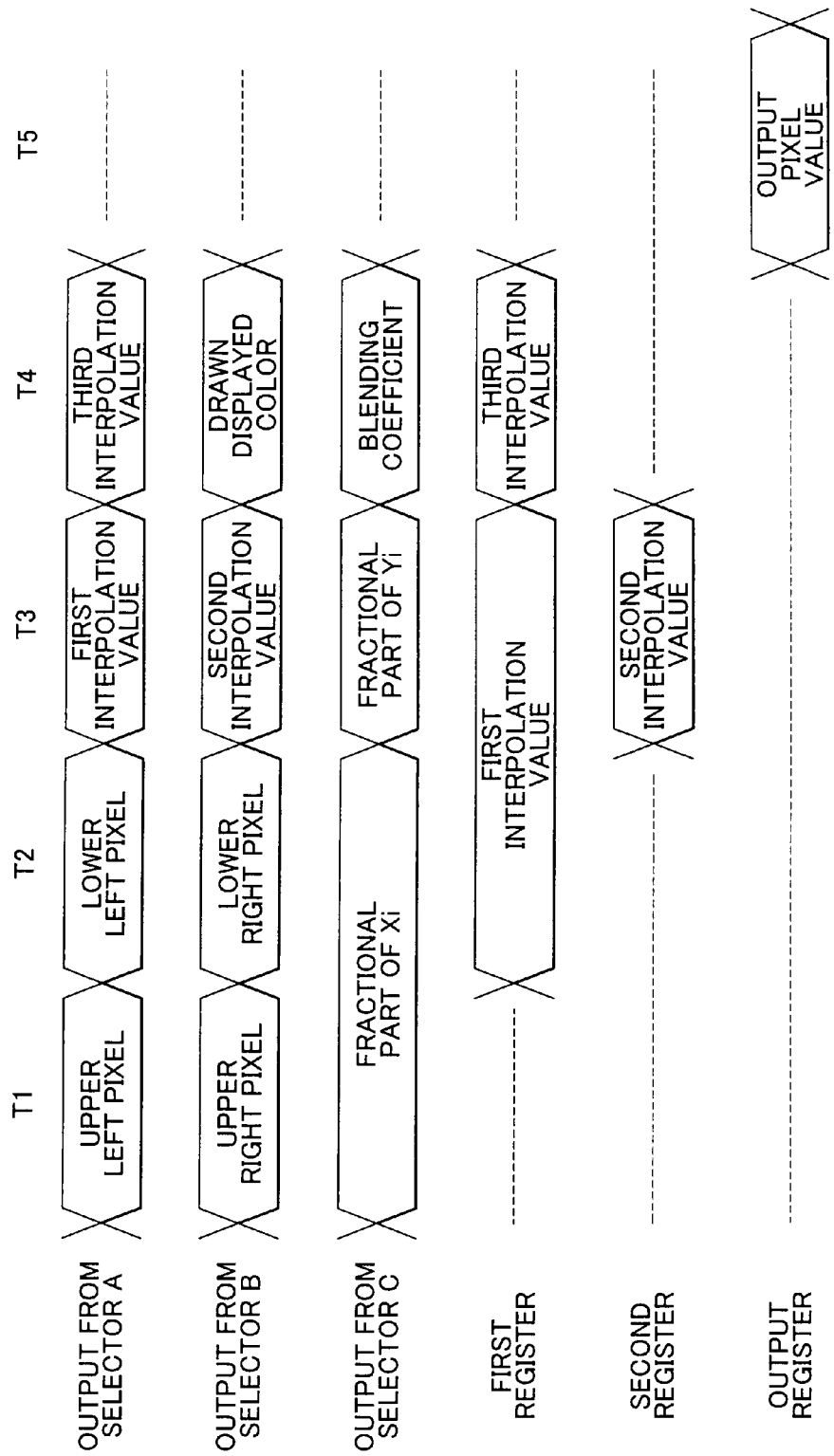
FIG. 19 is a timing chart for describing operation of the output image-generating section 25 of the fifth embodiment.

Operation of the output image-generating section 25 will be described below with reference to a timing chart shown in FIG. 19. First, in order to obtain the first interpolation value, the selector A selects the pixel value of the upper left pixel, the selector B selects the pixel value of the upper right pixel, and the selector C selects the fractional part of Xi (T1). The fractional part of Xi is a 4-bit binary value that represents the fractional part value, for example. The 4-bit binary value is supplied to the multiplier B as a multiplier as it is, and the complement number thereof is supplied to the multiplier A. In both cases of the binary and the decimal, the complement number section one's complement number (1−(original number)). FIG. 20 shows the correspondences between the binary expression and the decimal expression that represent fractional part, and the complement number thereof.

Thus, the pixel value of the upper left pixel is supplied to the multiplier A as a multiplicand, and the value of (1−(fractional part of Xi)) is supplied to the multiplier A as a multiplier. The pixel value of the upper right pixel is supplied to the multiplier B as a multiplicand, and the value of the fractional part of Xi is supplied to the multiplier B as a multiplier. Thus, the output from the adder becomes the first interpolation value. The first interpolation value is held in the first register.

Next, the selector A selects the pixel value of the lower left pixel, the selector B selects the pixel value of the lower right pixel, and the selector C selects the fractional part of Xi (T2). Thus, the output from the adder becomes the second interpolation value. The second interpolation value is held in the second register.

Subsequently, the selector A selects the value of the first register, the selector B selects the value of the second register, and the selector C selects the fractional part of Yi (T3).

Thus, the first interpolation value is supplied to the multiplier A as a multiplicand, and the value of (1−(fractional part of Yi)) is supplied to the multiplier A as a multiplier. Meanwhile, the second interpolation value is supplied to the multiplier B as a multiplicand, and the value of the fractional part of Yi is supplied to the multiplier B as a multiplier. Thus, the output from the adder becomes the third interpolation value. The third interpolation value is held in the first register.

Finally, the selector A selects the value of the first register, the selector B selects the displayed color, and the selector C selects the blending coefficient (T4).

Thus, the third interpolation value is supplied to the multiplier A as a multiplicand, and the value of (1−(blending coefficient)) is supplied to the multiplier A as a multiplier. The displayed color is supplied to the multiplier B as a multiplicand, and the value of the blending coefficient is supplied to the multiplier B as a multiplier. Thus, the output from the adder becomes the output pixel value that has been subjected to the α-blending process. This value is held in the output register (T5).

Although the procedure is adopted in which the interpolation with respect to the X direction is first performed and then the interpolation with respect to the Y direction is performed, a procedure may be adopted in which the interpolation with respect to the Y direction is first performed and then the interpolation with respect to the X direction is performed. In addition, although in the above description, two multipliers are provided, a configuration may be adopted in which one multiplier is used and two multiplications are performed separately and serially in two steps.

Although the invention has been described with reference to the embodiments, the invention is not limited to these embodiments at all, and various modifications and substitutions may be made without departing from the spirit and scope of the invention.

For example, the overlay image is not limited to a computer-generated image whose displayed color is specified, but may be a captured image or the like that is received from another camera.

The invention can be used in the field of image processor manufacturing, automobile manufacturing, automobile parts manufacturing, etc.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A composite image-generating device comprising:
a geometric transformation table that assigns coordinates corresponding to positions of pixels of an output image on an input image received from a capturing section; and
an output image-generating section that generates the output image by performing interpolation using pixel values of pixels of the input image that surround a point that corresponds with the coordinates assigned on the input image in the geometric transformation table, wherein
the output image-generating section generates the output image by replacing, based on overlay data, at least part of the pixel values of the pixels that surround the point that corresponds with the coordinates assigned on the input image and then performing the interpolation, with regard to the pixel of the output image for which the overlay data is provided,
the geometric transformation table includes a selection flag that corresponds to the positions of the pixels of the output image, and
the selection flag indicates which of the pixels of the output image are replaced by the output image-generating section based on the overlay data.

2. The composite image-generating device according to claim 1, further comprising:
a coordinate conversion section that converts a fractional part of coordinates of a row direction of the coordinates assigned on the input image in the geometric transformation table, in accordance with a blending coefficient that affects the opacity of the at least part of the pixel values replaced based on the overlay data,
wherein the output image-generating section generates the output image by performing a blending operation based on the fractional part of the coordinate of the row direction converted by the coordinate conversion section, with regard to the pixel of the output image for which the overlay data is provided by an overlay data section.

3. The composite image-generating device according to claim 1, further comprising:
a coordinate conversion section that converts a fractional part of coordinates of a column direction of the coordinates assigned on the input image in the geometric transformation table, in accordance with a blending coefficient that affects the opacity of the at least part of the pixel values replaced based on the overly data,
wherein the output image-generating section generates the output image by performing a blending operation based on the fractional part of the coordinate of the column direction converted by the coordinate conversion section, with regard to the pixel of the output image for which the overlay data is provided by an overlay data section.

4. The composite image-generating device according to claim 1, wherein:
the geometric transformation table includes a displayed color,
when the selection flag indicates that the pixels of the output image are replaced by the output image-generating section based on the overlay data, the output image-generating section generates the displayed color at the respective pixels of the output image, and
when the selection flag indicates that the pixels of the output image are not replaced by the output image-generating section, the output image-generating section generates the interpolated pixel values of the pixels of the input image that surround the points that correspond to the respective pixels of the output image.

5. The composite image-generating device according to claim 4, wherein:
  the geometric transformation table includes a blending coefficient, and
  the pixels of the output image that are replaced by the displayed color are weighted with the blending coefficient.

6. The composite image-generating device according to claim 1, the overlay data corresponds to extension lines indicating a vehicle width.

* * * * *